United States Patent
Daigle et al.

(10) Patent No.: US 8,041,716 B2
(45) Date of Patent: Oct. 18, 2011

(54) APPARATUS, METHODS AND COMPUTER PRODUCTS FOR SELECTION OF CONTENT BASED ON TRANSCRIPT SEARCHES

(75) Inventors: Brian Daigle, Marietta, GA (US); Jerry Liu, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 412 days.

(21) Appl. No.: 12/245,429

(22) Filed: Oct. 3, 2008

(65) Prior Publication Data

US 2010/0088293 A1 Apr. 8, 2010

(51) Int. Cl.
*G06F 7/00* (2006.01)

(52) U.S. Cl. ........ 707/728; 707/783; 707/914; 707/917; 725/25; 725/53

(58) Field of Classification Search .................. 707/728, 707/783, 914, 917, 999.003, 999.009
See application file for complete search history.

(56) References Cited

U.S. PATENT DOCUMENTS

| | | | |
|---|---|---|---|
| 7,080,392 B1* | 7/2006 | Geshwind | 725/34 |
| 2001/0014971 A1* | 8/2001 | Nagashima et al. | 725/46 |
| 2004/0079798 A1* | 4/2004 | Messenger et al. | 235/381 |
| 2004/0117831 A1* | 6/2004 | Ellis et al. | 725/53 |
| 2005/0076378 A1* | 4/2005 | Omoigui | 725/87 |
| 2005/0086127 A1* | 4/2005 | Hastings et al. | 705/26 |
| 2005/0235320 A1* | 10/2005 | Maze et al. | 725/52 |
| 2006/0239640 A1* | 10/2006 | Watanabe et al. | 386/83 |
| 2007/0154163 A1* | 7/2007 | Cordray | 386/52 |
| 2007/0157249 A1* | 7/2007 | Cordray et al. | 725/58 |
| 2008/0016529 A1* | 1/2008 | Kitagawa | 725/39 |
| 2008/0059884 A1* | 3/2008 | Ellis et al. | 715/721 |
| 2008/0066106 A1* | 3/2008 | Ellis et al. | 725/40 |
| 2008/0086688 A1* | 4/2008 | Chandratillake et al. | 715/719 |
| 2008/0196021 A1* | 8/2008 | Clinton et al. | 717/172 |
| 2008/0301232 A1* | 12/2008 | Facemire et al. | 709/205 |
| 2008/0307463 A1* | 12/2008 | Beetcher et al. | 725/53 |
| 2009/0178078 A1* | 7/2009 | Daigle et al. | 725/40 |
| 2009/0183204 A1* | 7/2009 | White | 725/44 |

* cited by examiner

*Primary Examiner* — Vei-Chung Liang
(74) *Attorney, Agent, or Firm* — Cantor Colburn LLP (57) ABSTRACT

An apparatus, methods, and computer program products for selection of content. The content search method includes receiving a search request having search data including search terms, utilizing the search request to query against databases comprising transcripts of programs yet to be released, and returning results to the search request.

13 Claims, 4 Drawing Sheets

| PROGRAM LISTING 300 | | | |
|---|---|---|---|
| Program (Today 9/25/2008) | Channel/Address | Related Text From Transcript | Availability |
| Code Name: The Cleaner | 34 | "XYZ" | Movie Currently Available |
| The Return of James | Not Available | Not Publicly Accessible | Movie to be released 4/8/2009 |
| Documentary: The Hit Man | 54 | Not Publicly Accessible | To be aired: 7/9/2009 |
| The Genius of the Mind | www.mycreatedmovies.com | Not Publicly Accessible | To be uploaded: 5/4/2008 |

APPARATUS, METHODS AND COMPUTER PRODUCTS FOR SELECTION OF CONTENT BASED ON TRANSCRIPT SEARCHES

BACKGROUND

Exemplary embodiments relate generally to communications systems, and more particularly, to an apparatus, methods and computer program products for selection of content based on a search of transcripts.

Internet protocol television (IPTV) is a digital television delivery service wherein the digital television signal is delivered to residential users via a computer network infrastructure using the Internet Protocol. Typically, IPTV services are bundled with additional Internet services such as Internet web access and voice over Internet protocol (VOIP). Subscribers receive IPTV services via a set-top box that is connected to a television or display device for the reception of a digital signal. Used in conjunction with an IP-based platform, the set-top box allows for a subscriber to access IPTV services and any additional services that are integrated within the IPTV service. In addition, DVRs can be coupled to the IPTV-enabled devices in order to record the content available from IPTV.

IPTV service platforms allow for an increase in the interactive services that can be provided to residential subscribers. As such, a subscriber can have access to a wide variety of content that is available via the IPTV service or the Internet. For example, a subscriber may utilize interactive services via a set top box to view IPTV content or access their personal electronic messaging accounts via an Internet web browser. The IPTV infrastructure also allows the delivery of a variety of video content instantly to the subscribers. Such content can be recorded on the subscriber's DVR.

Often, content available for viewing includes transcripts that can be associated with the content or encoded in closed caption streams associated with the content. Although these transcripts can be accessible by the public, for content that is unpublished there lacks the ability to search the transcripts.

BRIEF SUMMARY

Exemplary embodiments include a content search method. The content search method includes receiving a search request having search data including search terms, utilizing the search request to query against databases comprising transcripts of programs yet to be released, and returning results to the search request.

Additional exemplary embodiments include a computer program product for searching for programming content. The computer program product includes receiving a search request having search data including search terms, utilizing the search request to query against databases comprising transcripts of programs yet to be released, and returning results to the search request.

Further exemplary embodiments include an apparatus configured to search for program content. The apparatus includes memory for storing one or more applications for searching for program content, and a processor, functionally coupled to the memory. The processor is responsive to computer-executable instructions contained in the program and operative to receive a search request having search data including search terms, utilize the search request to query against databases comprising transcripts of programs yet to be released, and return results to the search request.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Exemplary embodiments include systems, methods, and devices for selection of content based on a search of transcripts, such as a search of transcripts for programs yet to be released. In exemplary embodiments, the systems and methods described here are implemented to search transcripts of programs that may or may not be available to the public. The transcripts can include text or file types for movies, television shows, closed caption streams, content recorded on a digital video recorder (DVR), and other program content searchable by a subscriber. In exemplary embodiments, a centralized server can include transcripts that a subscriber can search without exposing the transcript (e.g., the text of the transcript) to the subscriber. In exemplary embodiments, the subscriber can search the transcripts by a keyword or key phrase. For example, the search can include a title search, movie summary search, dialogue search, etc. In turn, a listing index of the program instances can be returned to the subscriber. Exemplary embodiments described herein can search upcoming programs to be released, on-demand programs and existing programs local to the subscriber (e.g., already recorded on the DVR). Upon receipt of the listing index, the subscriber can select an item from the listing to navigate to the location of the program. In exemplary embodiments, the program can begin playing at the location of the keyword or phrase. In exemplary embodiments, the subscriber can elect to record the program. In further exemplary embodiments, the systems and methods described herein can search for programs based on transcripts as described herein. However, instead of performing the search to include content, the search can be performed to exclude content. As such, the content that has been identified in the exclusion search can be removed from a subscribers guide or DVR.

Figure 1:
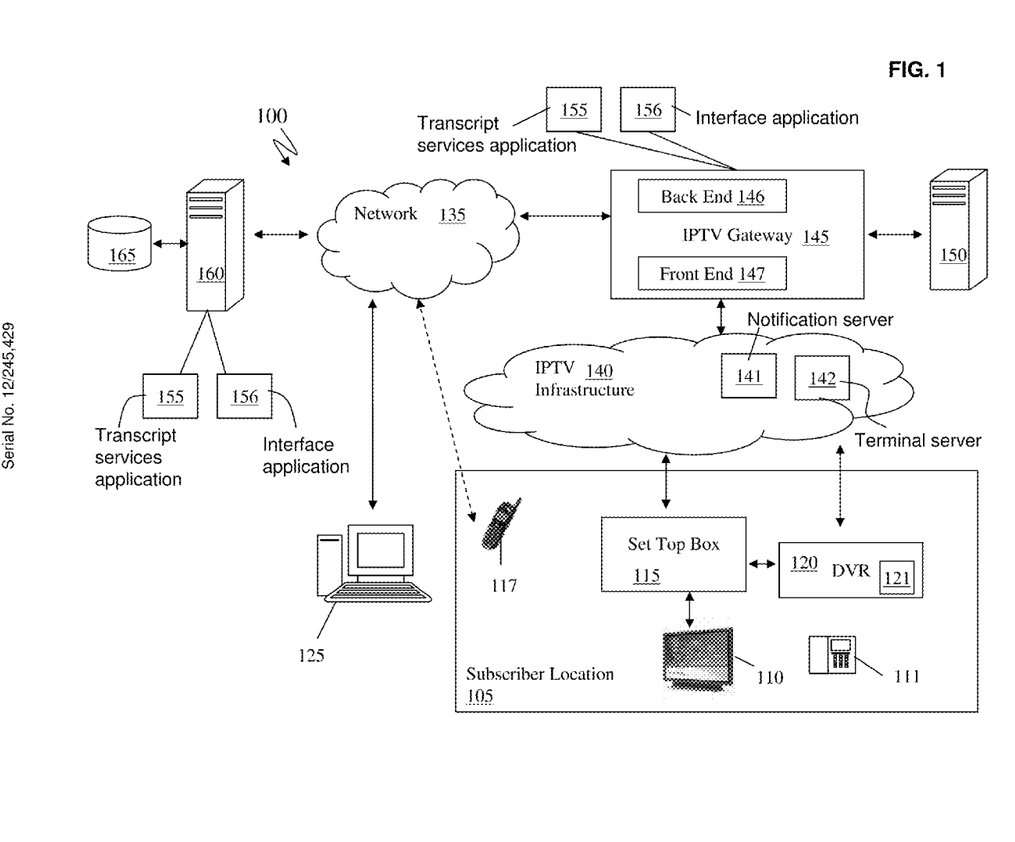
FIG. 1 illustrates a block diagram of an exemplary system for selection of content based on transcript searches.

Turning now to FIG. 1, a block diagram of an exemplary system 100 for selection of content based on transcript searches is now described. For ease of illustration, the system 100 of FIG. 1 depicts a simplified network infrastructure. In addition, for ease of illustration, the system 100 is described implementing an Internet Protocol Television (IPTV) system for reception of programming and scheduling. It is understood that the systems and methods described herein can implement television and program-viewing systems other than IPTV. For example, the system 100 can implement cable, satellite, and antenna.

Furthermore, it is understood that a variety of network components/nodes may be utilized in implementing the embodiments described herein. For example, in exemplary embodiments, the system 100 includes a means for accessing network services for multiple disparate devices using a single sign on procedure. Therefore, the system 100 manages accounts, each of which is established for a community of devices and/or device subscribers, such as those devices and subscribers in a subscriber location 105, which may include a communications device 110 (e.g., an IPTV-enabled television) coupled to a computing device, such as a set top box 115. Where the communications device 110 is IPTV, the set top box 115 includes a processor that provides bi-directional communications between an IPTV infrastructure 140 and the communications device 110 and decodes the video streaming media received as content programming and onscreen programming information, from a content services provider server 160, discussed further below. Other services can be provided to the subscriber location 105, such as, but not limited to phone services, network services and other exemplary services such as the selection of content based on transcripts services that can be implemented via the communications device 110. The accounts may thus include phone, network access and IPTV services and may be used to provide access to the selection of content based on transcripts services as described further herein. Furthermore, in exemplary embodiments, one of the devices (e.g., the communications device 110) can be provisioned for the network services described herein by associating a device identifier of the communications device with a respective account. The account, in turn, identifies each of the communications devices belonging to the community and provides other information as described herein. Furthermore, it is appreciated that other devices such as a subscriber computer 125 can be further included in the community of devices established for the subscriber location 105. It is appreciated that the subscriber computer 125 can be local to the subscriber location 105 or can represent any other remote computer that can be used to access the services (such as access to transcripts services) described herein. It is further appreciated that other remote devices can be implemented to access the services described herein such as but not limited to a cellular telephone (e.g., a 3G cell phone), a personal computer, a laptop computer, a portable computing device (e.g., personal digital assistant), and a digital music player (e.g., MP3 player), collectively represented as a device 117. As discussed further herein, a selection of content based on a transcripts services interface can be rendered on any of the above-referenced devices to implement the selection of content based on transcripts services in accordance with exemplary embodiments.

In exemplary embodiments, one of the devices, such as the communications device 110 (and the set top box 115, in combination) can be used to establish account services, such as the selection of content based on transcripts services described herein. An account record may be generated for the subscriber at the subscriber location 105, which identifies the subscriber and the account for which the services (e.g., basic account services as described above and the selection of content based on transcripts services described herein) are provided. Account information and records may be stored in a storage device accessible by an IPTV gateway 145, discussed below. In exemplary embodiments, the IPTV gateway 145 implements one or more applications for establishing access to and utilizing the selection of content based on transcripts services account. Access to the selection of content based on transcripts services account may thus be created for a community of communications devices (e.g., the communications device 110) to enable the communications devices to implement the selection of content based on transcripts services as described herein. A preferences server 150, which is coupled to the IPTV gateway 145, includes preferences information for the subscriber location 105 as described further herein.

As discussed above, the system 100 of FIG. 1 includes the subscriber location 105, such as the subscriber's household. The subscriber location 105 can include the communications device 110 (e.g., an IPTV-enabled television) in communication with the set top box 115. The subscriber location 105 can further include a personal digital recorder such as a DVR 120, which is in communication with the communication device 110 and the set top box 115. It is understood that the set top box 115 and the DVR 120 may be two separate devices or be a single integrated device. In exemplary embodiments, the DVR 120 is hard-disk based, but may have other suitable storage media such as a cache 121. It is appreciated that the DVR 120 can have other suitable memory devices for receiving and storing programming and scheduling data. Therefore, a "memory" or "recording medium" can be any means that contains, stores, communicates, propagates, or transports the program and/or data for use by or in conjunction with an instruction execution system, apparatus or device. The memory and the recording medium can be, but are not limited to, an electronic, magnetic, optical, electromagnetic, infrared or semiconductor system, apparatus or device. The memory and recording medium also include, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored. It is appreciated that the DVR 120 may be local on the set top box 115 (as described), or networked, or on an allocated media server storage space.

The subscriber location 105 can further include a remote control 111 for control and navigation of the communications device 110. As further described herein the remote control 111 can be implemented to navigate the DVR management and scheduling services interface. As discussed above, the subscriber location 105 can further include one or more remote devices in its community of devices. For example, the remote devices can include the remote subscriber computer 125. In exemplary embodiments, the remote subscriber computer 125 can be part of the subscriber location 105, or a computer that is accessed remotely in order to access the selection of content based on transcripts services for control, management and scheduling of video content (e.g., content for recording on the DVR 120) from the content services provider server 160 to the subscriber location 105 for rendering on the communications device 110. It is therefore appreciated that access to the selection of content based on transcripts services can be managed from a location remote to the subscriber location 105. It is understood by those skilled in the art that the remote subscriber computer 125 can include input and output devices, such as but not limited to a display, a mouse and a keyboard. Other devices that can access the selection of content based on transcripts services include the device 117. As discussed further below, the aforementioned devices can all interact with an IPTV infrastructure, such as the IPTV infrastructure 140, and the IPTV gateway 145. It is appreciated that any of the aforementioned devices can implement the selection of content based on transcripts services. In exemplary embodiments, the communications devices herein can have a network address associated with the communications devices such as an addressable uniform resource locator (URL), an Internet address, and/or a media access control (MAC) address.

The system 100 can implement the selection of content based on transcripts services such that desired content selection, control, management and scheduling can be managed and viewed through the subscriber's IPTV-enabled device, such as the communications device 110, via the set top box 115, the remote devices (e.g., the remote subscriber computer 125, and the device 117) or other suitable device. As such, to coordinate IPTV communication, the system 100 may further include the IPTV gateway 145 that is in communication with the IPTV infrastructure 140. The IPTV infrastructure 140 and the IPTV gateway 145 are used in conjunction to communicate via a network 135. For example, a suitable device (e.g., the communications device 110, the device 117, and the remote subscriber computer 125) at the subscriber location 105 can implement the IPTV infrastructure 140 and the IPTV gateway 145 to communicate with the content services provider server 160 and to access data from databases such as a database 165 (described further herein).

The network 135 can be an IP-based network for communication between the content services provider server 160 and the subscriber location 105 using communication devices such as but not limited to the communications device 110 (via the set top box 115, for example). The network 135 can be implemented to transmit content from the content services provider server 160 to the subscriber location 105 via a broadband connection, for example. In exemplary embodiments, the network 135 can be a managed IP network administered by a service provider. The network 135 can also be implemented in a wireless fashion, e.g., using wireless protocols and technologies, such as Wi-Fi, Wi-Max, etc. The network 135 can also be a cellular communications network, a fixed wireless network, a wireless local area network (LAN), a wireless wide area network (WAN), a personal area network (PAN), intranet, metropolitan area network, Internet network, or other similar type of network environment or other suitable network system and includes equipment for receiving and transmitting signals. In other exemplary embodiments, the network 135 can be a circuit-switched network such as a standard public switched telephone network (PSTN).

In exemplary embodiments, the IPTV infrastructure 140 can be an IP-based network that receives network data (e.g., programming content for display on the communications device or recording on the DVR) from the content services provider server 160 and the preferences server 150, and delivers the network data to the set top box 115 for display or other rendering on the communications device 110. Additionally, the network data can be for display or rendering on the remote subscriber computer 125 or other suitable device, such as device 117.

In exemplary embodiments, as discussed above, the IPTV infrastructure 140 provides an interface between the subscriber location 105 and the IPTV gateway 145. In exemplary implementations, a notification server 141 and a terminal server 142 operate to interface communication between the subscriber location 105 via the set top box 115, and the IPTV gateway 145. For example, in exemplary implementations, the set top box 115 can provide a unique identification number so that the IPTV gateway 145 can route the network data to the set top box 115. In doing so, a message is passed between the notification server 141 and the set top box 115. Furthermore, the IPTV gateway 145 provides an interface between the content services provider server 160, and the IPTV infrastructure 140 and subscriber location 105. In exemplary embodiments, the IPTV gateway 145 handles notifications to the IPTV subscriber location 105 and can further provide a history of the notifications. A selection of content based on transcripts services application 155 can reside partially or wholly on the IPTV gateway 145 to handle the notifications as further described herein. Also, the transcripts services application 155 may reside on the content services provider server 160. In exemplary embodiments, the selection of content based on transcripts services application 155 can further reside partially or wholly on the set top box 115, the remote subscriber computer 125, and the device 117. When the subscriber sets up his/her selection of content based on transcripts services on the communications device 110 (or other device in the subscriber location 105, remote device, such as the subscriber computer 125 and device 117), one of the network components of the system 100 (e.g., the set top box 115, or the IPTV gateway 145) can store specific scheduling information that the subscriber has created. For example, as discussed further herein, each subscriber can search for content based on a search on a transcript and thus access and manipulate viewing and recording information for the DVR 120 via an interface. As such, if the interface is stored on the IPTV gateway 145, messages and notifications can be passed between the subscriber location 105 and the IPTV gateway 145 that include present scheduling and historic scheduling that the subscriber has created in the past. Furthermore, if any changes in the subscribers scheduled recordings have occurred, messages can be passed to the subscriber location 105 (or remote device) to notify the subscriber that a program scheduled to be recorded on the DVR 120 has changed. The subscriber can make changes accordingly.

In exemplary embodiments, the IPTV gateway 145 can further interface with the various system 100 elements as described herein. For example, the IPTV gateway 145 is in communication with the preferences server 150 to pass notifications and messages (e.g., Email messages) regarding permissions to create and edit DVR management and scheduling information. For example, different members of the subscriber location 105 who share account services may have different recording schedules. For example, one member may have a first unique recording schedule and another member may have a second unique recording schedule with little to no overlap with the first recording schedule. As such, each member can retrieve and edit those different schedules and be properly authenticated to retrieve and edit those schedules.

In exemplary embodiments, the IPTV gateway 145 can include a back end 146 and a front end 147. The front end 147 can be used to implement various provisioning activities such as but not limited to initial provisioning of IPTV addresses for the devices at subscriber location 105. The back end 146 can be implemented for many of the selections of content based on transcripts services, such as communicating with the content services provider server 160 to search for content based on a search of a transcript stored in the database 165. The system 100 can retrieve and schedule programming data from the database 165, and pass messages and notifications to the IPTV gateway 145. As such, the back end 146 can include various elements including but not limited to a caller ID handler, SMS handler, message handler, and provisioning handler.

In exemplary embodiments, messages and notifications can be sent between the IPTV gateway 145 and the subscriber location 105. In exemplary embodiments, the message and notifications can be implemented via an email message. In exemplary embodiments, the IPTV gateway 145 is responsible for retrieving email messages that have been sent to an IPTV subscriber and providing notification of the reception of the email message to the IPTV subscriber at the subscriber location 105. A notification can be in the form a "pop-up" display window displayed at a suitable device (e.g., the communications device 110) or any other conventional message notification scheme. As discussed above, the IPTV gateway 145 can present a history of the notifications to the IPTV subscriber.

In exemplary embodiments, the IPTV gateway 145 interfaces with a POP3 infrastructure in order to retrieve email messages that have been directed to an IPTV subscriber. Additionally, the IPTV gateway 145 can interface with the preferences server 150. As described herein, the preferences server 150 is responsible for handling the performance preferences for the system 100 as dictated by the desires of an IPTV subscriber. Further, the IPTV gateway 145 is responsible for retrieving an IPTV subscriber's preferences for the set top box 115.

In exemplary embodiments, the IPTV gateway 145 interacts with the IPTV infrastructure 140 to accomplish the actual transmittal of the email message to the set top box 115. Further, all email notifications that are generated within the system 100 are saved to a log at the IPTV gateway 145. In exemplary embodiments, the subscriber can view a listing of the received email message log on their display device via an application that runs on the set top box 115.

In exemplary embodiments, the front end 147 can include a message center application that is in communication with a message center enterprise java bean (EJB) and an email handler that are included within the back-end 146. The IPTV infrastructure 140 is provisioned with the subscriber user account numbers and the set top box 115 identifiers. In exemplary embodiments, the IPTV gateway 145 includes a telephone number-to-account number mapping component, wherein a provisioned telephone number correlates to the IPTV subscriber's primary household telephone number (e.g., to the device 117). The IPTV subscriber's telephone number is further associated with the IPTV subscriber's email address. Further, the telephone number and email address are linked with the subscriber's IPTV account number through a web-provisioning interface that is available within the IPTV gateway 145. The IPTV gateway 145 has the ability to retrieve email messages and any image or audio/video attachments to the message, wherein the messages and the attachments are displayed as notifications on the communications device 110.

In exemplary embodiments, the subscriber is provisioned a primary email account. The email account is associated with the telephone number of the IPTV subscriber's primary household telephone number (e.g., the local part of the subscriber's email address can comprise the primary household telephone number). The primary email account may be configured to auto-forward all received email messages to a secondary email account that can be serviced by an email server. After being forwarded to the secondary email account, the email message can be configured to be deleted from the sending primary email account.

At predetermined time intervals, the back-end 146 periodically polls the email server to ascertain if the email server has received any new email messages. The back end 146 can include a POP3 reader thread, which is configured to periodically read a POP3 mailbox that has been configured to receive IPTV email messages. The back-end 146 can retrieve new email messages from the email server. For each retrieved email message, the back-end 146 saves the text of the email message, and if attached, the first image file attachment to an email log. The IPTV gateway 145 can transmit a notification to the subscriber location 105 that an email message has been received. The IPTV gateway 145 stores the received email message information, thus allowing the IPTV subscriber to retrieve the email message information at a later time period with the use of the message center application. As described herein, messages and notifications can be implemented for a variety of purposes related to the selection of content based on transcripts services described herein. For example, notifications can be sent to the subscriber household related to scheduling in which the subscriber may be interested, scheduling conflicts within the subscriber's recording schedule, and capacity issues with the DVR 120.

In exemplary embodiments, the IPTV gateway 145 may implement authentication using a high-speed processing device (e.g., a computer system) that is capable of handling high volume activities conducted via communications devices, and other network entities (e.g., parts of the IPTV infrastructure 140, network 135, etc.) via one or more networks (e.g., the IPTV infrastructure 140). The IPTV gateway 145 receives requests from one or more devices from the subscriber location 105 to access network services, such as the selection of content based on transcripts services. The IPTV gateway 145 may implement authentication software for restricting or controlling access to network. The IPTV gateway 145 may be in communication with a customer identity system (CIS) database, which stores subscriber credentials (e.g., subscriber names and passwords) established via the DVR management and scheduling services account.

In exemplary embodiments, the system 100 can further include the selection of content based on transcripts services application 155 that can reside on the IPTV gateway 145, as mentioned above. In exemplary embodiments, the selection of content based on transcripts services application 155 can be implemented by the subscriber to access and set up an interface application 156 to implement the selection of content based on transcripts services application 155. The interface application 156 can be implemented to locally or remotely search for and schedule programs based on a transcript search for display on the communications device 110 or recording on the DVR 120. The interface application 156 can further be implemented to access account information from the IPTV gateway 145 and the preferences server 150. In exemplary embodiments, the selection of content based on transcripts services application 155 can include pointers to the content services provider server 160 for accessing scheduling information and for directing content that has been selected based on a transcript search to be viewed on the communications device 110 or recorded on the DVR 120. The pointers, in turn, provide access to the schedules stored in the database 165 for streaming to the subscriber's set top box 115 for rendering on the communications device 110. The interface application 156 is shown as residing on the IPTV gateway 145. It is appreciated that the interface application 156 can reside (partially or wholly) on the set top box 115, on the server content services provider server 160, on the subscriber's computer 125, and or the device 117.

In exemplary embodiments, as discussed above, the system 100 further includes the content services provider server 160, which is in communication with the IPTV gateway 145 via the network 135. In exemplary embodiments, the content services provider server 160 is implemented by a host system (e.g., a high-speed processing device) that provides content to its subscribers (e.g., a subscriber of the communications device 110), such as television programs, premium programming services, video on demand content, and Internet/Web content (e.g., podcasts, and streaming media). In exemplary embodiments, the content is transmitted to the subscribers (e.g., at subscriber location 105) via a broadband connection over an Internet Protocol (IP)-based network (e.g., network 135). The content services provider server 160 can also provide an onscreen programming guide (e.g., EPG) to customers (e.g., the subscriber of program receiving device 150) that provides information about current and future programming available via the content providers' services. Programming information provided by the onscreen programming guide may include current and future program listings including program titles, primary actors/actresses, begin time, duration of program, a year in which the program was produced, and a brief text description of the program.

In exemplary embodiments, the content services provider server 160 is coupled to the database 165. In one implementation, the database 165 may be representative of a given play list. A play list is associated with a particular program screen. For example, a play list can be generated for a given screen that is displayed for a view on the communications device 110. As a subscriber is browsing through different channels, and therefore different program content, as each new channel and program content are displayed on the communications device 110, a different play list is accessed by the communications device 110 from the content services provider server 160, which can be via the set top box 115. In exemplary embodiments, play lists can include programming content, as well as programming schedules for the content (e.g., onscreen programming guide information (EPG)). In exemplary embodiments, the database 165 stores records of programming events scheduled for transmission to customers, such as communications device. These records, in turn, can be used in conjunction with the DVR 120 in order to schedule recordings. In further exemplary embodiments, the database 165 may be representative of a plurality of databases comprising one or more transcripts of programs that have already been released and of programs that are yet to be released.

In exemplary embodiments, the subscriber may recall a line of dialogue from a movie, but cannot remember the title of the movie. The subscriber may recall that he/she enjoyed the movie and desires to record the movie. As such, the subscriber can implement the selection of content via the transcripts services application 155 to conduct a search over the network 135 for the movie based on the dialogue that the subscriber does recall. The selection of content based on transcripts services application 155 can therefore search the network 135 and subsequently the database 165 that does include the transcript containing the dialogue. In exemplary embodiments, the movie content may reside on the database 165 along with the transcript. As such, the subscriber can schedule the movie for viewing on the communications device or recording on the DVR 120. In further exemplary embodiments, if the movie content does not reside on the database 165 along with the transcript, the database 165 can include pointers to the location of the actual movie content. Subsequently, the subscriber can access the location of the movie content for viewing on the communications device 110 or recording on the DVR 120. In the present example, when the content is retrieved, the content can begin playing at the point in which the dialogue occurs. It is appreciated that in other exemplary embodiments, the location of the content can be returned or the program can begin playing at the beginning of the program. It is appreciated that there are numerous options for how the program can be displayed and sent to the subscriber location 105.

In exemplary embodiments, transcripts may also be available for programs that have already been recorded on the DVR 120. As such, if the program already resides on the DVR 120, if the subscriber performs a search for content based on a transcript search, the results of the search would include an indication (e.g., on the communications device 110) that the content resides on the DVR 120. It is further appreciated that the subscriber may have a set of search criteria based on content that the subscriber desires to record on the DVR 120 (e.g., a "wish-list"). The user may implement the selection of content based on transcripts services application 155 in order to search for content based on a transcript search, using the "wish-list" criteria. In this way, the selection of content based on transcripts services application 155 can search the DVR 120, the network 135 and associated databases such as the database 165 for content based on a transcript search using the "wish-list" criteria. As discussed above, the search can return indications of locations where the content resides. Subsequently, the subscriber can access the locations for access to the content for viewing on the communications device 110 or recording on the DVR 120.

In exemplary embodiments, the subscriber can elect to have the system 100 display content based on certain display criteria. For example, the subscriber can request to display content that is about to be recorded, or content that has been recorded. In addition, the subscriber can request that this content be compared to a wish list or a season pass that the subscriber may have with a content services provider.

As discussed herein, transcripts may also be available for programs that have not yet been released. For example, the content services provider can encode transcript information on a closed caption stream (on the database 165) prior to the content being published. Also, the content provider can store partial or whole text of transcripts of dialogue of programs prior to being published. In exemplary embodiments, the system 100 can be implemented to search for content based on the transcripts. For example, the subscriber may want to access content for a not-yet-released season of a popular television series. The subscriber can search for content based on a search of a transcript using character names or events that the subscriber has speculated may occur on the television series. However, it is appreciated that the content services provider maintains control of the transcript and the associated content. As such, the subscriber can search the transcript, but is prevented from accessing the actual content, according to exemplary embodiments. As such, the actual content of the transcript may not be exposed to the subscriber performing the search. In this way, the subscriber can find and search the transcript, and subsequently schedule the television series for recording on the DVR 120, for example. However, none of the content is actually sent to the subscriber location 105 until the content services provider decides that the content can be transmitted, according to exemplary embodiments. In this way, the subscriber is prevented from obtaining the actual content (such as the transcript or program) and is also prevented from obtaining and guessing season "spoilers" by speculating on significant plot events. As such, the content services provider further has the discretion to determine what content can actually be searched. For example, in exemplary embodiments, the transcript (if any) that is made available on the database 165 may be a "bare bones" transcript that does not include any significant dialogue or "spoilers", but may simply include a summary of the series. Also, within the system 100, the content services provider may include logic or an algorithm (e.g., an exclusion application configured) to prevent subscribers from receiving results to search data can determine the outcome of a yet to be released program. For example, no search results may be returned for a search if the exclusion application determines that the search data is an attempt to guess the outcome of the program. As such, there may be, e.g., an exclusion threshold to prevent search results from being returned for certain searches.

It is therefore appreciated that the subscriber can have access to a system (for information that is not publicly available) that is secure and can compare content from the search to content that is publicly available. The subscriber can use the search results to schedule recordings of the content when the content is made publicly available or to set up reminders to send to the subscriber location when the content is made publicly available.

As described above, in exemplary embodiments, the subscriber can elect to have the system 100 display content based on certain display criteria. For example, the subscriber can request to display content that is about to be recorded, or content that has been recorded. In addition, the subscriber can request that this content be compared to a wish list or a season pass that the subscriber may have with a content services provider. The subscriber can also set up an order for searching for content based on a transcript search. For example, the subscriber can set up the order to search (transcripts) for: movies that have not yet been released, video on demand, upcoming programs to be recorded on the DVR 120, existing programs on the DVR 120, and existing movies on the network 135 (e.g., from the database 165).

In exemplary embodiments, upon a request from the subscriber location 105, the IPTV gateway 145 can coordinate obtaining the acquired data from the database 165 and provide the acquired data for display and rendering at the subscriber location 105. It is appreciated that the searching for content (such as the transcripts of programs yet to be released), the coordination of acquiring the data, and ultimately the displaying of data on the communications device 110 (or other device) may be implemented via the selection of content based on transcripts services application 155.

In exemplary embodiments, upon a request from the subscriber location 105, the IPTV gateway 145 can coordinate obtaining the content from the database 165 and provide the acquired data (e.g., transcript portions) for display and rendering at the subscriber location 105. As described, the coordination of acquiring the data and ultimately displaying the data on the communications device 110 (or other device) is implemented via the selection of content based on transcripts services application 155. Furthermore, the selection of content based on transcripts services application 155 coordinates the transfer of the program data from the database 165 for rendering on the communications device 110.

In exemplary embodiments, the subscriber inputs a word or phrase (e.g., search term(s)) into the system 100 via, e.g., the transcripts services application 155 and/or the interface application 156. As described further herein, the system 100 accepts the search terms as input. It is appreciated that the search terms are independent whether the program is past, current or future (including unreleased). From the point of view of the subscriber and the system 100, the search is directed to finding a program regardless of its release status.

In exemplary embodiments, the search terms are queried against one or more sets of available information (e.g., the database 165). In exemplary embodiments, one of the data sets that is searched may be a dataset containing transcripts for movies. In exemplary embodiments, the systems and methods described herein focus on a subset of the transcript data (e.g., the transcripts for movies or programs that occur in the future). As described above, these transcripts of future programs are yet to be published to the public. However, the systems and methods described herein provide the ability to access these transcripts on a limited basis. For example, if the subscriber enters the search term "Hero fights terrorists," then one of the many sets of data that the transcripts services application 155 searches is the one for unpublished transcripts. It is appreciated that an upcoming movie "Hero 4" includes the terms "Hero fights terrorists" in its movie transcript. Since "Hero 4" has yet to be released, the movie transcript would not be publicly viewable, but is made searchable via the exemplary search systems and methods described herein. If the transcript does include the terms "Hero fights terrorists", the program associated with it (Hero 4) would appear in a list of programs that is returned to the subscriber. In exemplary embodiments, the systems and methods described herein can include a guard against spoilers. For example, if the subscriber enters the terms "Hero dies", the system may not return any results or the system may return results that intentionally mislead the searcher, in accordance with exemplary embodiments. In this way, regardless of whether or not the main character, Hero, dies in the movie, the system does not provide the outcome of the mortality of the Hero. As such, if the subscriber enters "Hero dies", then no search term may be returned. It is appreciated that if the system did return a result, then the subscriber may be lead to believe that the Hero dies in "Hero 4". By returning results for more generic terms, the subscriber is still provided with an indication of future movies, but does not have the plot spoiled. In exemplary embodiments, transcripts can be created to "misdirect" the subscriber. For example, the transcript can include various alternate endings or plots, different from the actual one to be aired.

In exemplary embodiments, the list of programs returned from an unviewable (i.e., future) transcript result can also include the results from searches into other sets of information, including existing publicly viewable transcripts, metadata, IPG data, and IMDB information.

Figure 2:
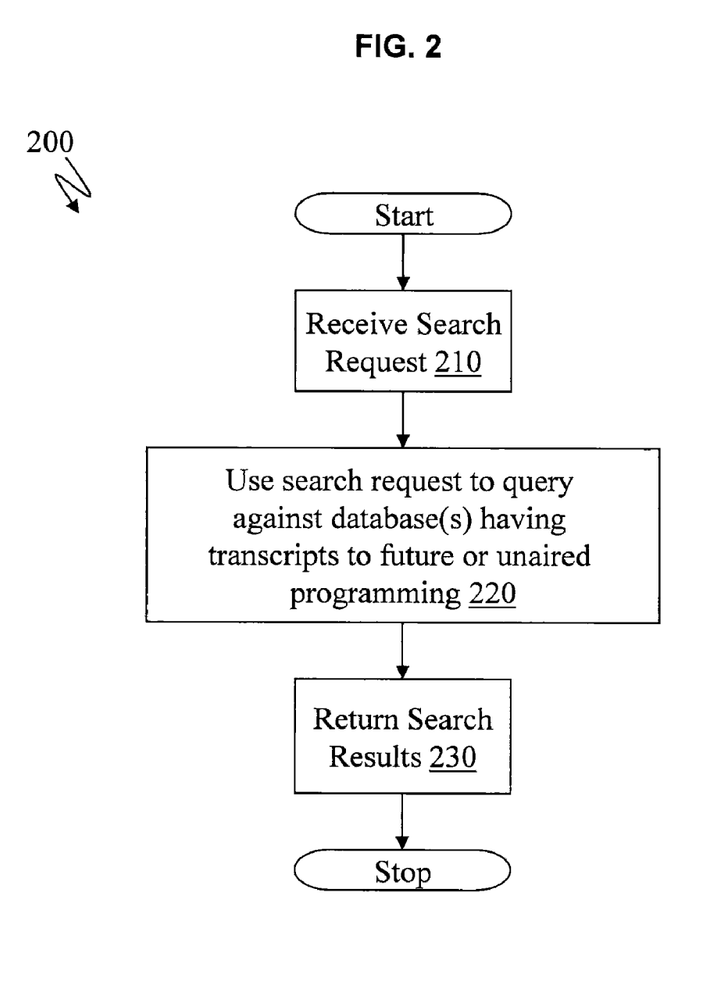
FIG. 2 illustrates a flow chart of a method for selection of content based on transcripts searches in accordance with exemplary embodiments.

FIG. 2 illustrates a flow chart of a method 200 for selection of content based on searches in accordance with exemplary embodiments. In accordance with exemplary embodiments, searches may be preformed by the transcripts services application 155 against a plurality databases such at the database 165.

At block 210, a content service provider may receive a search request via the transcripts services application 155 and/or the interface application 156. The search request may include one or more search terms to search content of a transcript. At block 220, the application 155 may use the search request to query against database(s) (such as the database 165) having transcripts to future and/or unaired programs. Also, the transcripts services application 155 may query existing programs. As an example, the search query may search movies that have not yet been released, video on demand, upcoming programs to be recorded on the DVR 120, existing programs on the DVR 120, and existing movies on the network 135 (e.g., from the database 165). For example, the application 155 may search documentaries that have yet to be aired or released.

At block 230, the transcripts services application 155 can return search results to the query. As discussed herein, the search results may be a name and/or channel for a program, such as a movie, television show, internet broadcast, etc. For example, a user may have just seen an accident occur or just witnessed an incident. Although it may be too early for breaking news about the incident to air (or be published), the user can utilize the transcripts services application 155 to search transcripts of future programs (such as transcripts for, e.g., upcoming (unreleased) news broadcasts or upcoming radio broadcasts), and the transcripts services application 155 can return which program(s) (and/or channel) to watch that will contain breaking news about the incident.

Further, in accordance with exemplary embodiments, the content service provider (entity) that controls the transcripts of programs yet to be released can control what, if any, information is returned to the search. For example, in response to the search, the entity may allow the name (or date) of a program to be returned, and/or the channel/address the program is to be released. However, the entity may not allow viewing access to the actual transcripts and/or portions of the transcripts since the program has not been aired yet. Accordingly, the transcripts of programs yet to be released may be inaccessible to the public, except for searching their transcripts.

Also, in accordance with exemplary embodiments, the transcripts services application 155 and/or the interface application 156 may provide programs matching the search request in a program list, and may prevent text of transcripts from being displayed in the program list for programs that are yet to be released.

As discussed herein, when utilizing the search request to query against databases comprising transcripts of programs yet to be released, the transcripts services application 155 can search (parse) text of the transcripts for programs yet to be released, locate text in the transcripts that matches the search data, and identify the programs (names) having text matching the search data.

The transcripts services application 155 and/or the interface application 156 may exclude a particular program from the program list in response to determining that the search data meets a respective predetermined threshold for exclusion. The predetermined threshold for exclusion may comprise an algorithm (e.g., the exclusion application) configured to determine if the search data prematurely reveals an outcome for the particular program.

Although the transcripts services application 155 can search databases (having transcripts) of programs yet to be aired, exemplary embodiments are not limited thereby. It is appreciated that existing programs can be searched. Further, the term program is not meant to be limiting. Programs may include any media over any platform.

Moreover, it is understood that exemplary embodiments are not limited to an IPTV platform, and any architecture may be utilized to implement exemplary embodiments.

Figure 3:
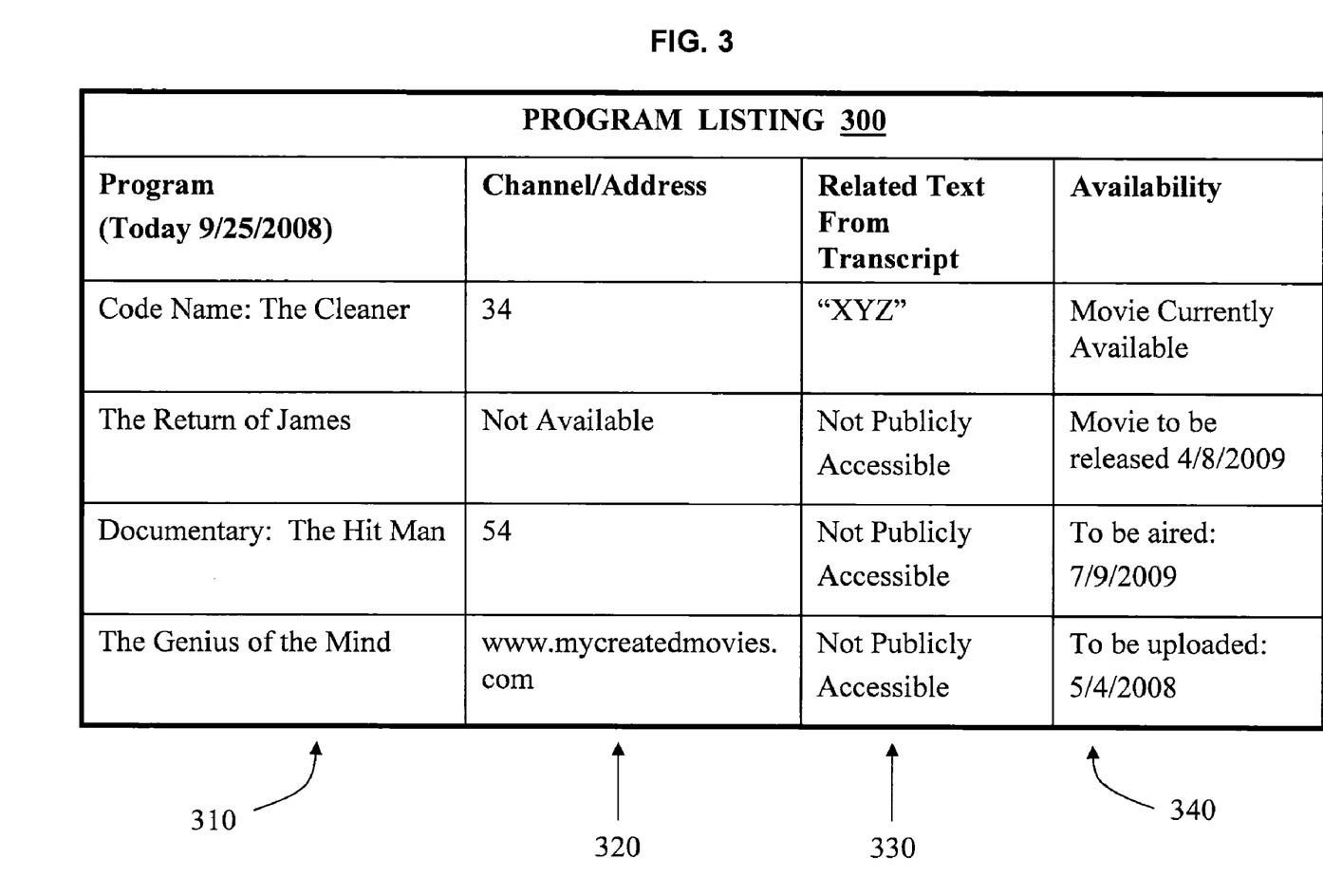
FIG. 3 illustrates an example program listing resulting from content searching in accordance with exemplary embodiments.

FIG. 3 illustrates an example program listing 300 resulting from content searching in accordance with exemplary embodiments.

To search for content, a user of the set top box 115 (the subscriber computer 125 and/or the device 117) may request that a search be performed to locate media by inputting search terms. For example, the user may input the search term "cleaner" on the communications device 110 via the set top box 115. The transcripts services application 155 may receive the search request with the search terms, and the transcripts services application 155 can query the server 160 and/or the database 165 to locate transcripts matching the corresponding search terms. As discussed herein, the database 165 may contain transcripts of programs yet to be aired or released, along with transcripts for existing programs. Also, the text of the transcripts may be restricted for programs yet to be aired or released, so the public does not have access to the text of the transcripts. However, the transcripts services application 155 can still run queries against restricted transcripts in the databases 165.

The transcripts services application 155 in conjunction with the interface application 156 provide the search results to the user. For example, the search results may be provided as the program listing 300. As seen in the program listing 300, column 310 shows the program name, column 320 shows the channel or address, column 330 shows text (images and/or links) of the particular transcript that corresponds to the search, column 340 shows the availability of the programs in the program listing 300.

As a result of the search request, the program listing 300 may include the movie Code Name: The Cleaner in column 310, and the channel that the movie is playing on in column 320. The program listing 300 may also display (optionally) a portion of the text (which may be a title, dialogue between characters, and/or closed captioning) from the transcript that corresponds to the search term.

In column 310, the Return of James may be a movie that has not been released in movie theaters, but limited access is allowed to the transcripts for, e.g., searching. However, the actual text of the transcript for Return of James would not be displayed. Also, as another example, if the Return of James was currently available (e.g., at the movie theater or on video on demand), the text of the transcript still may not be available for display in column 330 although the text of transcript can be searched. As such, column 320 may indicate that the Return of James can been seen at Smith's Movies 16 on 103 Peachtree St., and column 340 may indicate that the movie has been released 2 weeks ago.

A documentary entitled the Hit Man could be in the works, and the transcript (or a draft of the transcript) may be in the database 165. The channel of the documentary may be shown in column 320, and the date the documentary is scheduled to be aired may be shown in column 340.

Further, an individual may choose to stream his or her video entitled the Genius of the Mind on the Internet. The transcript for the video may be searched and may contain the search terms. The URL (e.g., web address) of the video may shown in column 320, and the availability date may be shown in column 340. The user may not desire to display the text of the transcript, so the text related to the search terms would not be displayed in column 330. The program listing 300 is for illustrative purposes only, and the program listing 300 is not meant to be limiting. It is understood that the information and appearance may be changed in accordance with preferences.

Figure 4:
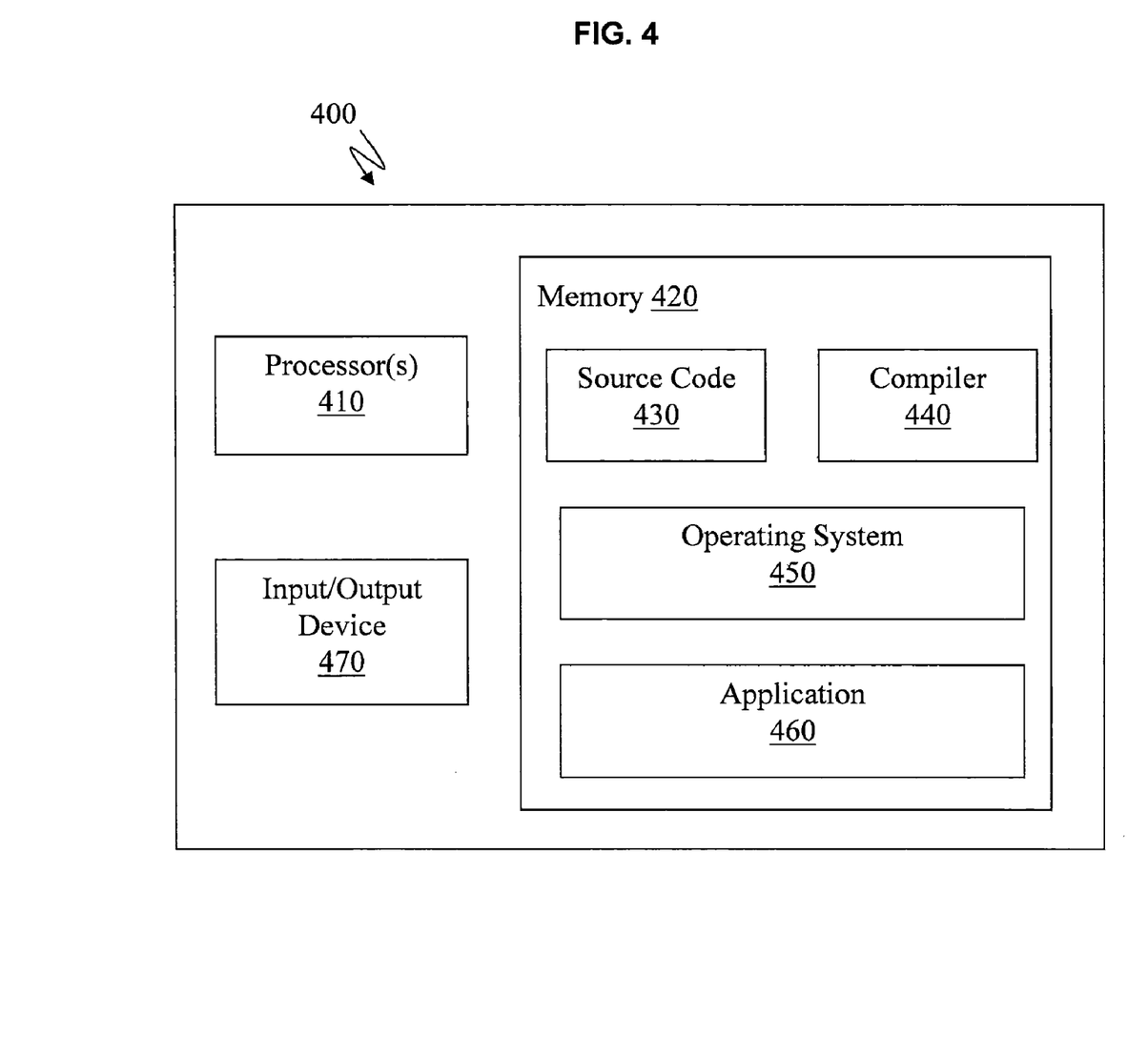
FIG. 4 illustrates an example of a computer having elements that may be used in implementing exemplary embodiments.

FIG. 4 illustrates an example of a computer 400 having elements that may be used in implementing exemplary embodiments. The computer 400 includes, but is not limited to, PCs, workstations, laptops, PDAs, palm devices, servers, mobile devices, and the like. The computer 400 may include a processor 410, memory 420, and one or more input and/or output (I/O) 470 devices (or peripherals) that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

According to exemplary embodiments, the processor 410 is a hardware device for executing software that can be stored in the memory 420. The processor 410 can be virtually any custom made or commercially available processor, a central processing unit (CPU), a data signal processor (DSP), or an auxiliary processor among several processors associated with the computer 400, and the processor 410 may be a semiconductor based microprocessor (in the form of a microchip) or a macroprocessor.

The memory 420 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 420 may incorporate electronic, magnetic, optical, and/or other types of storage media. Note that the memory 420 can have a distributed architecture, where various components are situated remote from one another, but can be accessed by the processor 410.

The software in the memory 420 may include one or more separate programs, each of which comprises an ordered listing of executable instructions for implementing logical functions. In the example illustrated in FIG. 4, the software in the memory 420 includes a suitable operating system (O/S) 450, compiler 440, source code 430, and an application 460 of the exemplary embodiments.

The operating system 450 controls the execution of other computer programs, and provides scheduling, input-output control, file and data management, memory management, and communication control and related services. It is contemplated by the inventors that the application 460 for implementing exemplary embodiments is applicable on all other commercially available operating systems.

The application 460 may be a source program, executable program (object code), script, or any other entity comprising a set of instructions to be performed. When a source program is to be executed, then the program is usually translated via a compiler (such as the compiler 440), assembler, interpreter, or the like, which may or may not be included within the memory 420, so as to operate properly in connection with the O/S 450. Furthermore, the application 460 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O 470 devices may include input devices such as, for example but not limited to, a mouse, keyboard, scanner, microphone, etc. Furthermore, the I/O 470 devices may also include output devices, for example but not limited to, a printer, display, etc. Also, the I/O 470 devices may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc.

When the computer 400 is in operation, the processor 410 is configured to execute software stored within the memory 420, to communicate data to and from the memory 420, and to generally control operations of the computer 400 pursuant to the software. The application 460 and the O/S 450 are read, in whole or in part, by the processor 410, perhaps buffered within the processor 410, and then executed.

When the application 460 is implemented in software, it should be noted that the application 460 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 460 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 460 is implemented in hardware, the application 460 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A content search method, comprising:
   receiving a search request having search data including search terms input by a user making the search request;
   utilizing the search request to query against databases comprising transcripts of programs yet to be released, the transcripts of the programs yet to be released comprise text of dialogue in movies yet to be released;
   returning results to the search request in which the results comprise matches to the search terms input by the user;
   responsive to determining that the search terms input by the user to search the transcripts are an attempt to determine an outcome of the movies yet to be released, excluding the results corresponding to the attempt;
   providing the programs matching the search request in a program list;
   preventing text of the transcripts from being displayed in the program list for the programs that are yet to be released; and
   excluding a particular program from the program list in response to determining that the search data meets a predetermined threshold for exclusion;
   wherein the predetermined threshold for exclusion comprises an algorithm configured to determine if the search data for searching text of dialogue in the movies yet to be released prematurely reveals an outcome for the particular program.

2. The method of claim 1, wherein the transcripts of the programs yet to be released are inaccessible to a public.

3. The method of claim 1, wherein utilizing the search request to query against the databases comprising the transcripts of the programs yet to be released comprises:
   searching text of the transcripts for the programs yet to be released;
   locating the text in the transcripts that matches the search data; and
   identifying the programs having the text matching the search data.

4. The method of claim 3, wherein returning the results to the search request comprises providing program names of the programs yet to be released.

5. The method of claim 1, wherein the databases further comprise transcripts of programs that have been released.

6. The method of claim 5, further comprising:
   providing program names of the programs yet to be released; and
   providing program names of the programs that have been released.

7. A computer program product embodied on a non-transitory computer readable medium for searching for program content, the computer program product including instructions for causing a computer to implement a method, the method comprising:
   receiving a search request having search data including search terms input by a user making the search request;
   utilizing the search request to query against databases comprising transcripts of programs yet to be released, the transcripts of the programs yet to be released comprise text of dialogue in movies yet to be released;
   returning results to the search request in which the results comprise matches to the search terms input by the user;
   responsive to determining that the search terms input by the user to search the transcripts are an attempt to determine an outcome of the movies yet to be released, excluding the results corresponding to the attempt;
   providing the programs matching the search request in a program list;
   preventing text of the transcripts from being displayed in the program list for the programs that are yet to be released; and
   excluding a particular program from the program list in response to determining that the search data meets a predetermined threshold for exclusion;
   wherein the predetermined threshold for exclusion comprises an algorithm configured to determine if the search data for searching text of dialogue in the movies yet to be released prematurely reveals an outcome for the particular program.

8. The computer program product of claim 7, wherein the transcripts of the programs yet to be released are inaccessible to a public.

9. The computer program product of claim 7, wherein utilizing the search request to query against the databases comprising the transcripts of the programs yet to be released comprises:
   searching text of the transcripts for the programs yet to be released;
   locating the text in the transcripts that matches the search data; and
   identifying the programs having the text matching the search data.

10. The computer program product of claim 9, wherein returning the results to the search request comprises providing program names of the programs yet to be released.

11. The computer program product of claim 7, wherein the databases further comprises-comprise transcripts of programs that have been released.

12. The computer program product of claim 11, further comprising:
    providing program names of the programs yet to be released; and
    providing program names of the programs that have been released.

13. An apparatus configured to search for program content comprising:
    memory for storing an application for searching for program content; and
    a processor, functionally coupled to the memory, the processor being responsive to computer-executable instructions contained in the application and operative to:
    receive a search request having search data including search terms input by a user making the search request;
    utilize the search request to query against databases comprising transcripts of programs yet to be released, the transcripts of the programs yet to be released comprise text of dialogue in movies yet to be released;
    return results to the search request in which the results comprise matches to the search terms input by the user;

responsive to determining that the search terms input by the user to search the transcripts are an attempt to determine an outcome of the movies yet to be released, excluding the results corresponding to the attempt;

provide the programs matching the search request in a program list;

prevent text of the transcripts from being displayed in the program list for the programs that are yet to be released; and exclude a particular program from the program list in response to determining that the search data meets a predetermined threshold for exclusion;

wherein the predetermined threshold for exclusion comprises an algorithm configured to determine if the search data for searching text of dialogue in the movies yet to be released prematurely reveals an outcome for the particular program.

* * * * *